(12) United States Patent
Sorensen et al.

(10) Patent No.: US 7,590,479 B2
(45) Date of Patent: *Sep. 15, 2009

(54) REMOTE LOGIN OF A PERSONAL COMPUTER

(75) Inventors: Jens Erik Sorensen, San Diego, CA (US); Jens Ole Sorensen, Rancho Santa Fe, CA (US)

(73) Assignee: Sorensen Research and Development Trust, San Diego, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 11/982,151

(22) Filed: Oct. 31, 2007

(65) Prior Publication Data

US 2008/0065277 A1 Mar. 13, 2008

Related U.S. Application Data

(62) Division of application No. 11/400,439, filed on Apr. 7, 2006, now Pat. No. 7,389,160, which is a division of application No. 10/850,625, filed on May 21, 2004, now Pat. No. 7,031,809.

(51) Int. Cl.
*H04K 1/00* (2006.01)
*H04L 9/00* (2006.01)
*G06F 11/30* (2006.01)

(52) U.S. Cl. ............................ 701/49; 701/2; 701/33; 701/35; 713/184

(58) Field of Classification Search .................. 701/49, 701/2, 33, 35; 713/184, 189, 186, 193, 201, 713/202; 340/5.81, 426.36; 726/2
See application file for complete search history.

(56) References Cited

U.S. PATENT DOCUMENTS

| 4,168,635 | A | 9/1979 | Savidan |
| 4,236,594 | A | 12/1980 | Ramsperger |
| 4,464,016 | A | 8/1984 | Weber et al. |
| 4,893,240 | A | 1/1990 | Karkouti |
| 4,920,338 | A | 4/1990 | Tsunoda et al. |
| 4,997,053 | A | 3/1991 | Drori et al. |
| 5,113,182 | A | 5/1992 | Suman et al. |
| 5,187,665 | A | 2/1993 | Futami et al. |
| 5,254,924 | A | 10/1993 | Ogasawara |
| 5,283,473 | A | 2/1994 | Furuse et al. |
| 5,406,261 | A | 4/1995 | Glenn |
| 5,677,665 | A | 10/1997 | Amano et al. |
| 5,712,625 | A | 1/1998 | Murphy |
| 5,721,625 | A | 2/1998 | Furusawa et al. |
| 5,765,840 | A | 6/1998 | Tame |

(Continued)

*Primary Examiner*—Tan Q Nguyen
(74) *Attorney, Agent, or Firm*—Edward W. Callan

(57) ABSTRACT

A system for remotely logging into a personal computer includes a controller coupled to the personal computer and a remote control device. The controller memorizes a login password for the personal computer. The remote control device transmits a login signal to which the controller responds by sending the memorized login password to the personal computer. When the personal computer is located in an automobile that includes apparatus for adjusting at least one component of the automobile to provide a plurality of arrangements of the at least one component, the controller controls the adjusting apparatus and memorizes at least a first component arrangement associated with the personal computer; and the controller responds to a first component arrangement signal received from a location remote from the controller by controlling the adjusting apparatus to provide the memorized first component arrangement.

24 Claims, 2 Drawing Sheets

U.S. PATENT DOCUMENTS

| | | |
|---|---|---|
| 5,812,399 A | 9/1998 | Judic et al. |
| 5,821,854 A | 10/1998 | Dorinski et al. |
| 5,822,707 A | 10/1998 | Breed et al. |
| 5,864,105 A | 1/1999 | Andrews |
| 5,925,128 A | 7/1999 | Harmon |
| 5,978,919 A | 11/1999 | Doi et al. |
| 6,070,240 A | 5/2000 | Xydis |
| 6,074,009 A | 6/2000 | Farino |
| 6,100,811 A | 8/2000 | Hsu et al. |
| 6,175,356 B1 | 1/2001 | Jung |
| 6,176,587 B1 | 1/2001 | Fredricks |
| 6,369,529 B1 | 4/2002 | McClintock et al. |
| 6,585,384 B2 | 7/2003 | Nielsen et al. |
| 6,756,885 B1 | 6/2004 | Flick |
| 6,847,288 B1 | 1/2005 | Baschnagel, III |
| 6,972,665 B2 | 12/2005 | Wang et al. |
| 7,020,785 B2 | 3/2006 | Kim et al. |
| 2002/0190842 A1 | 12/2002 | Sasaki et al. |
| 2004/0098481 A1 | 5/2004 | Gunji et al. |
| 2004/0263323 A1 | 12/2004 | Seike et al. |
| 2005/0099275 A1 | 5/2005 | Kamdar et al. |

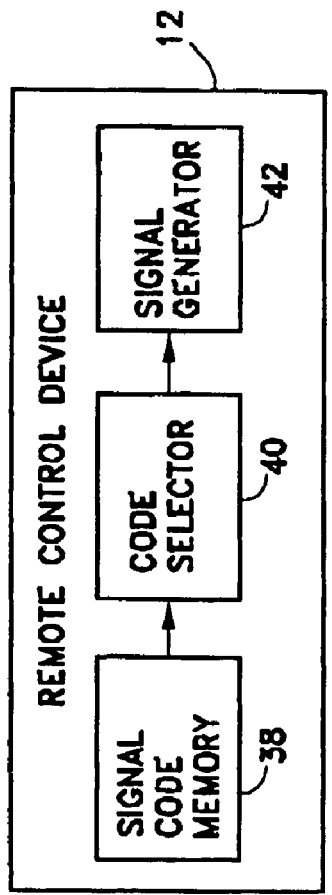
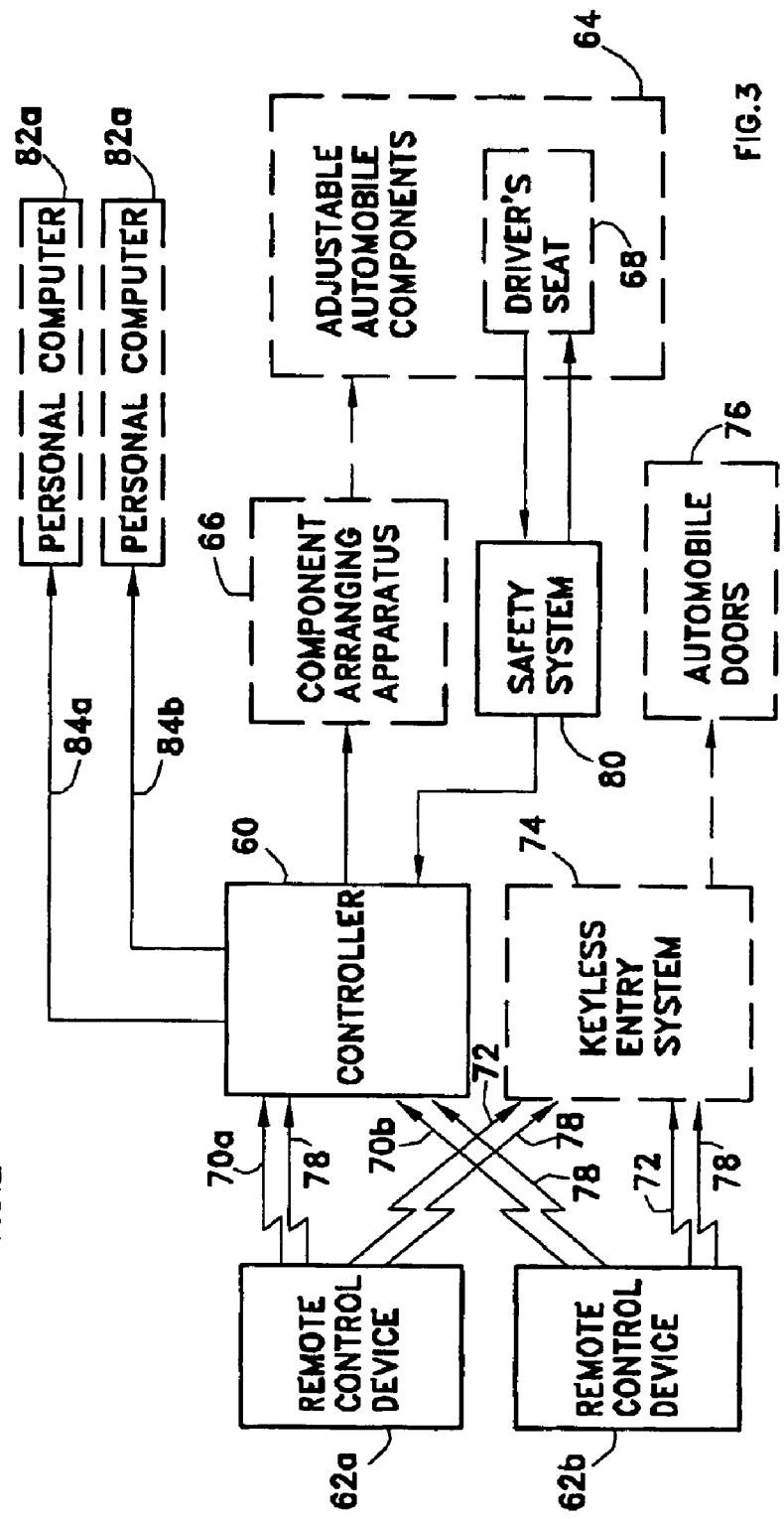

US 7,590,479 B2

REMOTE LOGIN OF A PERSONAL COMPUTER

CROSS-REFERNCE TO RELATED APPLICATIONS

This is a division of application Ser. No. 11/400,439 filed Apr. 7, 2006, now U.S. Pat. No. 7,389,160. Application Ser. No. 11/400,439 was filed as a division of application Ser. No. 10/850,625, which was filed May 21, 2004 and issued on Apr. 18, 2006 as U.S. Pat. No. 7,031,809.

BACKGROUND OF THE INVENTION

The present invention generally pertains to electronic control systems and methods and is particularly directed to remotely logging into a personal computer. The present invention is further directed to remotely controlling a plurality of preferred arrangements of at least one component of an automobile in which the personal computer is located.

In the prior art it is known to provide a system for remotely controlling the position of a seat in an automobile. Such system includes a seat positioning control system for controlling adjustment of the seat to a given position; and a remote control device for transmitting a signal that causes the seat positioning control system to adjust the seat to the given position.

In the prior art it also is known to provide a system for remotely controlling the door locks in an automobile. Such system includes a keyless-entry system for locking and unlocking one or more doors of the automobile and a remote control device for selectively transmitting a lock-request signal for causing the keyless-entry system to lock the doors, and an unlock-request signal for causing the keyless-entry system to unlock one or more doors.

SUMMARY OF THE INVENTION

The present invention provides a system for remotely logging into a personal computer, comprising: a controller coupled to the personal computer, wherein the controller includes means for memorizing a login password for the personal computer; and wherein the controller is adapted for responding to a login signal from a remote control device by sending the memorized login password to the personal computer.

The present invention also provides a method of remotely logging into a personal computer, comprising the steps of:

(a) with a remote control device, transmitting a login signal; and (b) with a controller that is coupled to the personal computer and includes a memorized login password for the personal computer, responding to said login signal by sending the memorized login password to the personal computer.

The present invention further provides a computer readable medium for use with a computer in a controller that is coupled to a personal computer, wherein the computer readable medium contains program instructions for:

(a) enabling the controller to memorize a login password for the personal computer; and (b) causing the controller to respond to a login signal received from a remote control device by sending the memorized login password to the personal computer.

The present invention may be advantageously combined with the remote control of a plurality of preferred arrangements of at least one component of an automobile in which the personal computer is located.

Additional features of the present invention are described with reference to the detailed description of the preferred embodiments.

BRIEF DESCRIPTION OF THE DRAWING

FIG. 2 is a block diagram of a portion of a remote control device used in the control system of FIG. 1.

FIG. 3 is a block diagram of a preferred embodiment of a control system according to another aspect of the present invention.

DETAILED DESCRIPTION

Figure 1:
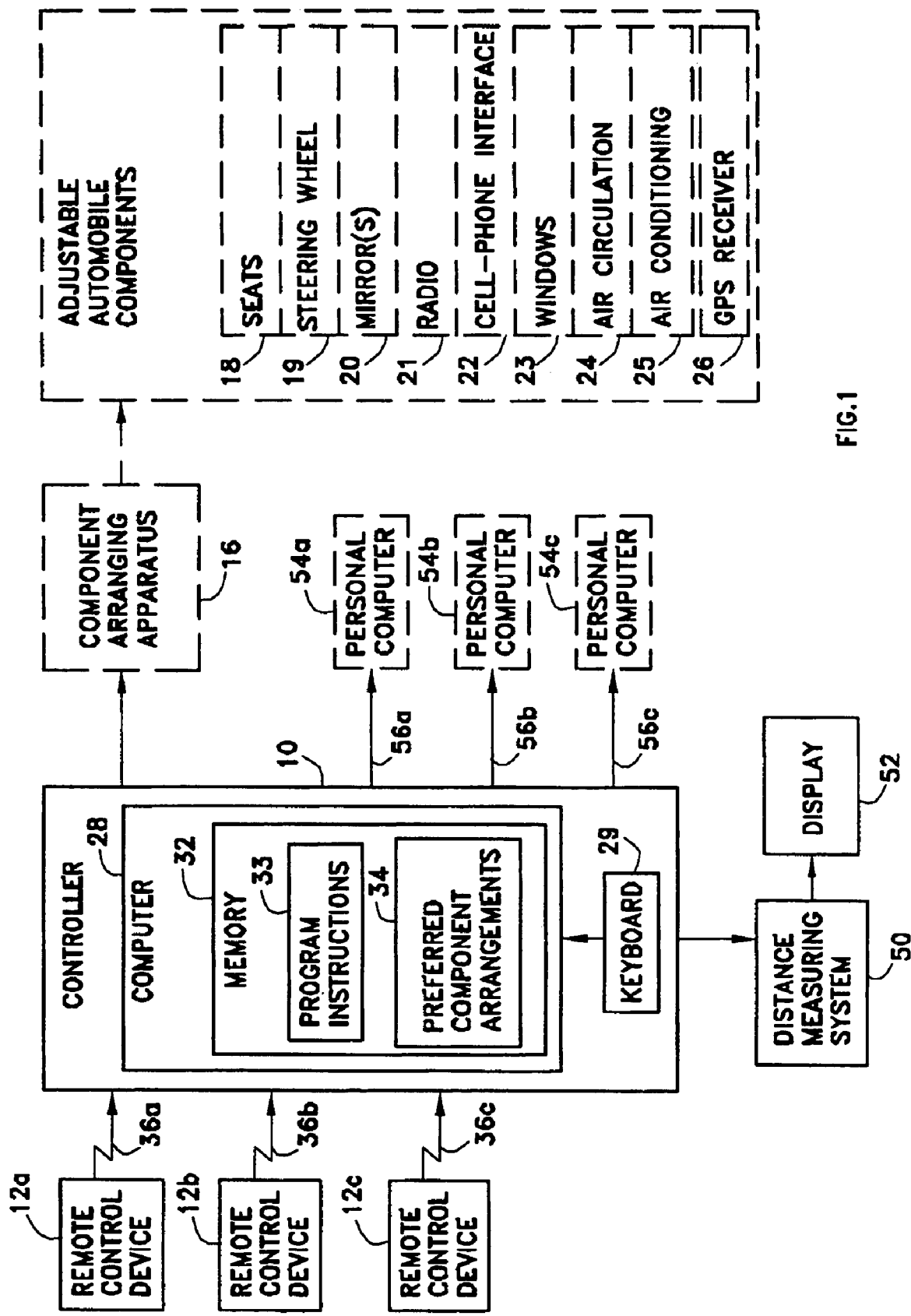
FIG. 1 is a block diagram of a preferred embodiment of a control system according to one aspect of the present invention.

Referring to FIG. 1, a preferred embodiment of a system according to the present invention includes a controller 10 and a plurality of remote control devices 12a, 12b, 12c. The controller 10 is installed in an automobile that includes a number of adjustable components 14 and apparatus 16 for arranging the components 14. The adjustable components 14 may include, but are not limited to, one or more seats 18, a steering wheel 19, one or more mirrors 20, a radio 21, a cell-phone interface 22, windows 23, an air circulation system 24, an air conditioning system 25 (including heating and/or cooling components) and a GPS receiver 26. The cell-phone interface 22 can be adjusted for accommodating cell phones having different cell-phone numbers. The windows 23 may include a sunroof window as well as the other windows. The component arranging apparatus 16 are operable to provide a plurality of arrangements of the adjustable automobile components 14.

The controller 10 includes a computer 28 and a keyboard 29. The computer 28 includes a processor (not shown) and a memory 32. The memory 32 includes a computer readable medium that contains program instructions 33 and memorized preferred component arrangements 34. The program instructions 33 also may be contained in a computer readable medium (not shown) that is separate from the computer 10, from which separate medium the program instructions 33 are downloaded into the computer memory 32.

The controller 10 is coupled to at least one of the component arranging apparatus 16 for controlling the operation of the coupled component arranging apparatus 16. The coupling between the controller 10 and the component arranging apparatus 16 may be accomplished by direct connection and/or by wireless interface. In most instances, the coupled component arranging apparatus 16 can also be operated independently of the controller 10.

The keyboard 29 is used for causing the computer memory 32 to selectively memorize different preferred component arrangements.

Upon one or more of the coupled component arranging apparatus 16 being operated by a first driver to adjust at least one of the adjustable automobile components 14 to provide a first preferred component arrangement, the keyboard 29 is operated to cause the memory 32 to memorize the first preferred component arrangement; and upon such component arranging apparatus 16 being operated by a second driver to adjust at least one of the adjustable automobile components 14 to provide a second preferred component arrangement, the keyboard 29 is again operated to cause the memory 32 to memorize the second preferred component arrangement. Likewise, and upon such component arranging apparatus 16 being operated by a third driver to adjust at least one of the adjustable automobile components 14 to provide a third preferred component arrangement, the keyboard 29 is again operated to cause the memory 32 to memorize the third preferred component arrangement.

In a preferred embodiment, the adjustable automobile components 14 that are adjusted to be in the preferred component arrangements include at least one seat 18, typically the driver's seat, and one or more of the following: the steering wheel 19, at least one mirror 20, a radio 21, a cell-phone interface 22, a window position control system 23, the air circulation control system 24, the air conditioning system 25 and the GPS receiver 26.

If a given numbered driver desires to revise his corresponding given numbered preferred component arrangement, the component arranging apparatus 16 are operated to revise the given numbered preferred component arrangement, and the keyboard 29 is operated to cause the memory 32 to memorize the revised given numbered preferred component arrangement.

In a preferred embodiment, the keyboard 29 contains three buttons bearing numbers "1", "2" and "3", that can be depressed to respectively cause the first, second and third preferred component arrangements 34 to be selectively stored in the memory 32. In other embodiments, alternative keyboards are provided.

The three remote control devices 12a, 12b, 12c are operable from locations remote from the automobile. The three remote control devices 12a, 12b, 12c are uniquely adapted for causing the controller 10 to control the component arranging apparatus 16 to provide the three respective memorized given numbered preferred component arrangements that are stored in the computer memory 32. In a preferred embodiment, each of the three remote control devices 12a, 12b, 12c, which respectively bear numbers "1", "2" and "3", contains a button that is depressed to cause a unique component-arrangement signal 36a, 36b, 36c to be transmitted for reception by the controller 10. Unique component-arrangement signals 36a, 36b, 36c are respectively transmitted by each of the three remote control devices 12a, 12b, 12c. In a preferred embodiment, the remote control devices 12a, 12b, 12c are embodied in handheld devices. In alternative embodiments, one or more of the remote control devices 12a, 12b, 12c is embodied in a device other than a handheld device.

In a preferred embodiment, the three remote control device 12a, 12b, 12c are of a common manufacture, but each can be adapted to transmit only a selected one of the three unique component-arrangement signals 36a, 36b, 36c so as to be incapable of causing the controller 10 to control the component arranging apparatus 16 to provide a memorized preferred component arrangement other than the given numbered preferred component arrangement for which the remote control device 12a, 12b, 12c is uniquely adapted. For example, the first remote control device 12a is incapable of causing the controller 10 to control the component arranging apparatus 16 to provide either the memorized second preferred component arrangement or the memorized third preferred component arrangement; and the second remote control device 12b is incapable of causing the controller 10 to control the component arranging apparatus 16 to provide either the memorized first preferred component arrangement or the memorized third preferred component arrangement.

Referring to FIG. 2, each of the commonly manufactured adaptable remote control devices 12 included in the embodiment of the system of FIG. 1 contains a signal code memory 38, a code selector 40 and a signal generator 42. Three different signal codes are stored in the memory 38. The code selector 40 is utilized to select one of the three stored signal codes corresponding to one of the three numbered preferred component arrangements; and the number of the selected arrangement is applied to the exterior of the remote control device. The signal generator 42 generates a unique component-arrangement signal that corresponds to the code selection.

In an alternative embodiment, each of the three remote control device 12a, 12b, 12c is of a unique manufacture that is adapted to transmit only a selected one of the three unique component-arrangement signals 36a, 36b, 36c.

Referring again to FIG. 1, a distance measuring system 50 is combined with the controller 10 for separately measuring the distance over which the automobile is driven while respectively in at least some of the memorized component arrangements. In a preferred embodiment, the distance measuring system 50 measures the distance that the automobile is driven while the automobile components 14 are in each of the first, second and third memorized preferred component arrangements. The preferred component arrangement that is applicable during each occasion upon which the automobile is driven is indicated by the controller 10 in accordance with the component-arrangement signal 36a, 36b, 36c received by the controller 10 from one of the remote control devices 12a, 12b, 12c. The distance measuring system thereby provides a measurement of the distance that the automobile is driven by each of the first, second and third drivers. A display device 52 is coupled to the distance measuring system 50 for displaying the distances driven by a selected one of the drivers during a selected period. Such a display is provided in response to operation of the keyboard 29.

Although three preferred component arrangements and three remote control devices 12a, 12b, 12c are included in the embodiment shown in FIG. 1, two or more than three preferred component arrangements and respective remote control devices for transmitting a corresponding number of differently coded component-arrangement signals can be included in alternative preferred embodiments.

In some of the preferred embodiments the controller 10 is also used for enabling each driver to remotely log into his respective personal computer 54a, 54b, 54c that may be located in the automobile. The personal computers 54a, 54b, 54c may be installed in the automobile. Alternatively one, some or all of the personal computers 54a, 54b, 54c may be a portable computer, such as a notebook or laptop computer or a handheld computer, which may be located in the automobile from time to time, but need not necessarily be located in the automobile at the time that the controller 10 is used for logging into the respective computer 54a, 54b, 54c. The controller 10 is coupled to first, second and third personal computers 54a, 54b, 54c. The coupling between the controller 10 and an individual one of the personal computers 54a, 54b, 54c may be accomplished by a direct connection or by a wireless interface. The coupled computers 54a, 54b, 54c can also be logged into independently of the controller 10.

The keyboard 29 is used for causing the computer memory 32 to memorize login passwords for the coupled personal computers 54a, 54b, 54c that are respectively associated with the component arrangements preferred by each of the first, second and third drivers. The first login password is for the first personal computer 54a; the second login password is for the second personal computer 54b; and the third login password is for the third personal computer 54c.

The unique first, second and third component-arrangement signals 36a, 36b, 36c, which are transmitted by the remote control devices 12a, 12b, 12c and received by the controller 10 are also interpreted by the controller 10 as first, second and third login signals. The controller 10 is adapted for responding to the first login signal by causing the first personal computer 54a to be turned on and by sending the memorized first login password 56a to the first personal computer 54a, for responding to the second login signal by causing the second personal computer 54b to be turned on and by sending the memorized second login password 56b to the second personal computer 54b, and for responding to the third login signal by causing the third personal computer 54c to be turned on and by sending the memorized third login password 56c to the third personal computer 54c.

In alternative embodiments, a personal computer is not associated with each of the preferred component arrangements. In fact there may not be any personal computers associated with any of the preferred component arrangements.

Referring again to the program instructions 33 stored in the memory 32, such program instructions 33 inter alia (i) enable the memory 32 to memorize a plurality of preferred component arrangements; (ii) cause the controller 10 to respond to respective component-arrangement signals 36a, 36b, 36c received from locations remote from the automobile by controlling the component arranging apparatus 16 to provide one of the memorized respective preferred component arrangements in accordance with the unique received component-arrangement signal 36a, 36b, 36c; (iii) enable the distance measurement system 50 to separately measure the distance over which the automobile is driven while respectively in at least some of the memorized preferred component arrangements; (iv) enable the memory 32 to memorize the login passwords for the plurality of coupled personal computers 54a, 54b, 54c; and (v) cause the controller 10 to respond to respective login signals 36a, 36b, 36c received from locations remote from the automobile by causing the respective personal computer 54a, 54b, 54c to be turned on and by sending the respective memorized login password 56a, 56b, 56c to the respective personal computer.

Referring to FIG. 3, a preferred embodiment of a control system according to another aspect of the present invention is adapted for controlling the position of a predetermined seat in a given automobile. This system includes a controller 60 and a plurality of remote control devices, including at least a first remote control device 62a and a second remote control device 62b. The controller 60 is installed in an automobile that includes a number of adjustable components 64 and one or more apparatus 66 for arranging the components 64. The adjustable automobile components 64 include a predetermined seat 68, preferably the driver's seat, and may also include, but are not limited to, one or more other components, such, a steering wheel, one or more mirrors, a radio, a cell-phone interface, windows, an air circulation system, and an air conditioning system. The component arranging apparatus 66 are operable to provide a plurality of arrangements of the adjustable components 64 of the automobile. The component arranging apparatus 66 include at least a seat arranging system for adjusting the predetermined seat 68.

The controller 60 includes the same components as described above as being included in the controller 10, and with respect to such above described components functions in the same manner as the controller 10. The controller 60 is coupled to the seat arranging system of the component arranging apparatus 66 and may be coupled to one or more of the other component arranging apparatus 66, such as the system for arranging the steering wheel and the apparatus for arranging one or more mirrors, for controlling the operation of the component arranging apparatus 66 to which the controller 60 is coupled. In most instances, the coupled component arranging apparatus 66 can also be operated independently of the controller 60. The controller 60 is used to control the adjustment of the predetermined seat 68 to a memorized seat position.

The first remote control device 62a is adapted for transmitting a first seat-position signal 70a indicating one memorized seat position; and the second remote control device 62b is adapted for transmitting a second seat-position signal 70b that indicates a different memorized seat position than the seat position indicated by the seat-position signal 70a transmitted by the first remote control device 62a.

The controller 60 is adapted for responding to the first seat-position signal 70a by causing the driver's seat 68 to be adjusted to the indicated one memorized position and for responding to the second seat-position signal 70b by causing the driver's seat 68 to be adjusted to the indicated different memorized position.

Each remote control device 62a, 62b also is adapted for transmitting an unlock-request signal 72 for causing a keyless-entry system 74 in the given automobile to unlock one or more doors 76 of the given automobile.

Each remote control device 62a, 62b is adapted for transmitting both the respective seat position signal 70a, 70b and the unlock-request signal 72 in response to a single manipulation of the respective remote control device 62a, 62b, such as by pressing an "unlock door" button.

In one embodiment, each remote control device 62a, 62b also is adapted for transmitting a lock-request signal 78 for causing the keyless-entry system 74 to lock the doors 76 of the given automobile; and the controller 60 is adapted for responding to the lock-request signal 78 by causing the driver's seat 68 to be adjusted to a locked seat position that cannot be utilized for driving the automobile.

In one embodiment, a safety system 80 is coupled to the driver's seat 68 for preventing the driver's seat 68 from being adjusted while the driver's seat 68 is occupied to the seat position that cannot be utilized for driving the automobile. In one aspect of this embodiment, the safety mechanism 80 detects when the driver's seat 68 is occupied and is coupled to the controller 60 for preventing the controller 60 from responding to the lock-request signal 78 by causing the driver's seat 68 to be adjusted while the driver's seat 68 is occupied to the seat position that cannot be utilized for driving the automobile. In another aspect of this embodiment, the safety system 80 includes a mechanism that physically impedes adjustment of the driver's seat 68 while the driver's seat 68 is occupied to the seat position that cannot be utilized for driving the automobile. In alternative versions of this embodiment only one or the other of these two aspects of the safety system 80 is included.

In one embodiment, a safety system 80 is coupled to the driver's seat 68 and the controller 60 for preventing the controller 60 from causing the driver's seat 68 to be adjusted while the driver's seat 68 is occupied in response to any signal 70a, 70b, 72, 78 received by the controller 60 from a remote control device 62a, 62b or from a source that is remote from the automobile.

In one embodiment, a seat adjusting apparatus (included in the component arranging apparatus 66), which adjusts one or more seats in response to the controller 60, is inhibited from applying more than a threshold amount of force while moving the seats (included in the adjustable automobile components 64) in a backward or forward direction in order to reduce or prevent damage to someone or something disposed behind or in front of a seat. In one aspect of this embodiment, the threshold is determined to be not more than the amount of force that would be required to overcome static resistance against said movement imposed by a minimum dimension of someone or something disposed behind or in front of the seat. In another aspect of this embodiment, the presence of someone or something behind or in front of the seat is detected while the seat is being adjusted by detecting an increase in the amount of force being applied above the threshold required to more the seat when there is no resistance to such movement, and in response to detecting such an increase further adjustment of the seat is inhibited.

The embodiment of FIG. 3 may also include a plurality of personal computers 82a, 82b, which are coupled to the controller 60 so that the controller 60 can enable each driver to remotely log into his respective personal computer 82a, 82b that may be located in the automobile by using his respective remote control device 62a, 62b. In this regard the controller 60 includes the same components as described above as being included in the controller 10 in the embodiment of FIG. 1, and with respect to such above described components the controller functions in the same manner as the controller 10 to memorize login passwords for the personal computers 82a, 82b, to turn on the personal computers 82a, 82b and to send the memorized login passwords 84a, 84b to the personal computers 82a, 82b. The personal computers 82a, 82b may be installed in the automobile or portable in the same manner as the personal computers 52a, 52b, 52c included in the embodiment of FIG. 1 and the personal computers 82a, 82b may be coupled be the controller 60 in the same manner as the personal computers 52a, 52b, 52c are coupled be the controller 10.

In the embodiment of FIG. 3, the program instructions stored in the memory of the computer in the controller 60 inter alia (i) enable the memory to memorize a plurality of preferred seat positions and the locked seat position that cannot be utilized for driving the automobile; (ii) cause the controller 60 to respond to a seat-position signal 70a, 70b that is received with an unlock-request signal 72 from a location remote from the automobile by causing the predetermined seat to be adjusted to a memorized seat position indicated by the respective received seat-position signal 70a, 70b; (iii) causes the controller 60 to respond to a lock-request signal 78 received from a location remote from the automobile by causing the driver's seat 68 to be adjusted to a locked position that cannot be utilized for driving the automobile; (iv) prevent the controller 60 from responding to the lock-request signal 78 by causing the driver's seat 68 to be adjusted while the driver's seat 68 is occupied; (v) enable the computer memory of the controller 60 to memorize the login passwords for the plurality of coupled personal computers 82a, 82b; and (vi) cause the controller 60 to respond to respective login signals 54a, 54b received from locations remote from the automobile by causing the respective personal computer 82a, 82b to be turned on and by sending the respective memorized login password 84a, 84b to the respective personal computer.

In one or more alternative embodiments, portions of the controller may be included in one or more of the remote control devices. For example, the remote control devices may include a keyboard, which is coupled to the computer memory by a wireless interface, wherein such a keyboard is adapted for causing the computer memory to selectively memorize the different preferred component arrangements and/or to memorize the login passwords for the respective personal computers.

In one or more alternative embodiments portions of the controller are contained in physically separate devices. For example, some portions of the controller computer, the controller computer memory and/or the controller computer processor may be contained within separate devices that are disparately coupled to different arranging apparatus for adjusting respectively different automobile components.

In one or more alternative embodiments, one, more or all of the remote control devices may include a plurality of numbered buttons that may be depressed selectively for transmitting the respective unique component-arrangement signals or login signals.

In one or more alternative embodiments a controller and one or more remote control devices are included in a system for remotely logging into one or more personal computers in the manner described hereinabove, wherein such system does not include a component arrangement function and/or is independent of a door unlocking function.

Not all of the features of the various embodiments described herein are included in any single embodiment of the present invention.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents. The claims require no implicit limitations. Each claim is to be construed explicitly as stated, or by its legal equivalent.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The invention claimed is:

1. A system for remotely logging into a personal computer, comprising:
   a controller coupled to the personal computer,
   wherein the controller includes means for memorizing a login password for the personal computer; and
   wherein the controller is adapted for responding to a login signal from a remote control device by sending the memorized login password to the personal computer.

2. A system according to claim 1, wherein the personal computer is located in an automobile.

3. A system according to claim 2, wherein the controller is adapted for controlling a plurality of preferred arrangements of at least one component of a said automobile that includes means for adjusting at least one component of the automobile to provide a plurality of arrangements of the at least one component; and
   wherein the controller includes means for memorizing the plurality of preferred component arrangements;
   wherein the controller is adapted to respond to a component arrangement signal that indicates a memorized preferred component arrangement by causing means for adjusting the at least one component to adjust the at least one component to the indicated memorized preferred component arrangement.

4. A system according to claim 2, wherein the controller is adapted for controlling a plurality of preferred arrangements of at least one component of a said automobile that includes means for adjusting at least one component of the automobile to provide a plurality of arrangements of the at least one component; and wherein the controller includes means for memorizing the plurality of preferred component arrangements;

wherein the controller is adapted to respond to a component arrangement signal, which is received with or is interpreted as the login signal and which indicates a memorized preferred component arrangement, by causing means for adjusting the at least one component to adjust the at least one component to the indicated memorized preferred component arrangement.

5. A system according to claim 1, wherein the controller is coupled to a plurality of said coupled personal computers located in an automobile;

wherein the controller includes means for memorizing a plurality of login passwords for said plurality of said coupled personal computers, including at least a first login password for a first said coupled personal computer and a second login password for a second said coupled personal computer;

wherein the controller is adapted for responding to a first said login signal received from a location remote from the automobile by sending the memorized first login password to the first personal computer; and wherein the controller is adapted for responding to a second said login signal received from a location remote from the automobile by sending the memorized second login password to the second personal computer.

6. A system according to claim 5, wherein the controller is adapted for controlling a plurality of preferred arrangements of at least one component of a said automobile that includes means for adjusting at least one component of the automobile to provide a plurality of arrangements of the at least one component;

wherein the controller includes means for memorizing the plurality of preferred component arrangements;

wherein the controller is adapted to respond to a first component arrangement signal, which is received with or is interpreted as the first said login signal and which indicates a memorized first preferred component arrangement associated with the first said coupled personal computer, by causing means for adjusting the at least one component to adjust the at least one component to the indicated memorized first preferred component arrangement; and wherein the controller is adapted to respond to a second component arrangement signal, which is received with or is interpreted as the second said login signal and which indicates a memorized first preferred component arrangement associated with the first said coupled personal computer, by causing means for adjusting the at least one component to adjust the at least one component to the indicated memorized second preferred component arrangement.

7. A system according to claim 1, further comprising:
a remote control device for transmitting the login signal.

8. A system according to claim 7, wherein the controller is adapted for controlling a seat positioning control system to adjust the position of a seat in the automobile to a preferred seat position and for memorizing the preferred seat position;

wherein the remote control device is adapted for transmitting a seat-position signal indicating the memorized preferred seat position; and wherein the controller is adapted to respond to the seat position signal by causing the seat positioning control system to adjust the seat to the indicated memorized preferred seat position.

9. A system according to claim 7, wherein the remote control device is adapted for transmitting the login signal with an unlock-request signal that is adapted for causing a keyless-entry system to unlock one or more doors of the automobile.

10. A system according to claim 7, wherein a portion of the controller is included in the remote control device.

11. A system according to claim 7, wherein portions of the controller are included in physically separate devices.

12. A system according to claim 7, wherein the remote control device includes a plurality of buttons that may be depressed selectively for transmitting unique login signals and/or unique component arrangement signals that indicate respective preferred arrangements of at least one component of an automobile that includes means for adjusting at least one component of the automobile to provide a plurality of arrangements of the at least one component.

13. A method of remotely logging into a personal computer, comprising the steps of:
(a) with a remote control device, transmitting a login signal; and
(b) with a controller that is coupled to the personal computer and includes a memorized login password for the personal computer, responding to said login signal by sending the memorized login password to the personal computer.

14. A method according to claim 13, wherein the controller is coupled to a plurality of said personal computers, the method further comprising the steps of;
(c) with the controller, memorizing a plurality of login passwords for said plurality of coupled personal computers, including at least a first login password for a first said coupled personal computer and a second login password for a second said coupled personal computer;
(d) with a first said remote control device, transmitting a first said login signal that the controller responds to by sending the memorized first login password to the first personal computer; and
(e) with a second said remote control device, transmitting a second said login signal that the controller responds to by sending the memorized second login password to the second personal computer.

15. A method according to claim 14, in combination with a method of controlling arrangements of at least one component of an automobile in which said plurality of personal computers are located and that includes means for adjusting at least one component of the automobile to provide a plurality of arrangements of the at least one component, said preferred arrangements including at least a first component arrangement and a second component arrangement, wherein the first personal computer is associated with the first component arrangement and the second personal computer is associated with the second component arrangement, the method of controlling arrangements comprising the steps of:
(f) with the controller, controlling the adjusting means, and memorizing a plurality of preferred component arrangements, including at least the first component arrangement and the second component arrangement;
(g) with a first said remote control device, transmitting a first component arrangement signal that causes the controller to control the adjusting means to provide the memorized first component arrangement; and
(h) with a second said remote control device, transmitting a second component arrangement signal that causes the controller to control the adjusting means to provide the memorized second component arrangement.

16. A combination of methods according to claim 15, wherein steps (d) and (g) comprise the step of:
(i) transmitting the first component arrangement signal with or as the first login signal;

and wherein steps (e) and (h) comprise the step of:
- (j) transmitting the second component arrangement signal with or as the second login signal.

17. A method according to claim 13, in combination with a method of controlling a plurality of preferred arrangements of at least one component of an automobile in which the personal computer is located and that includes means for adjusting at least one component of the automobile to provide a plurality of arrangements of the at least one component, said preferred arrangements including at least a first component arrangement that is associated with the personal computer, the method of controlling arrangements comprising the steps of:
- (c) with the controller, controlling the adjusting means, and memorizing at least the first component arrangement; and
- (d) with the remote control device, transmitting a component arrangement signal that causes the controller to control the adjusting means to provide the memorized first component arrangement.

18. A combination of methods according to claim 17, wherein steps (a) and (d) comprise the step of:
- (e) transmitting the component arrangement signal with or as the login signal.

19. A method according to claim 13, wherein step (a) comprises the step of:
- (c) transmitting the login signal with an unlock-request signal that causes a keyless-entry system to unlock one or more doors of the automobile.

20. A computer readable medium for use with a computer in a controller that is coupled to a personal computer, wherein the computer readable medium contains program instructions for:
- (a) enabling the controller to memorize a login password for the personal computer; and
- (b) causing the controller to respond to a login signal received from a remote control device by sending the memorized login password to the personal computer.

21. A computer readable medium according to claim 20, wherein the controller is coupled to a plurality of personal computers, and wherein the computer readable medium also contains program instructions for:
- (c) causing the controller to memorize a plurality of login passwords for said plurality of coupled personal computers, including at least a first login password for a first said coupled personal computer and a second login password for a second said coupled personal computer;
- (d) causing the controller to respond to a first said login signal by sending the memorized first login password to the first personal computer; and
- (e) causing the controller to respond to a second said login signal by sending the memorized second login password to the second personal computer.

22. A computer readable medium according to claim 21, wherein said plurality of personal computers are located in an automobile that includes means for adjusting at least one component of the automobile to provide a plurality of arrangements of the at least one component, said preferred arrangements including at least a first component arrangement and a second component arrangement, wherein the first personal computer is associated with the first component arrangement and the second personal computer is associated with the second component arrangement, wherein the computer readable medium also contains program instructions for:
- (f) causing the controller to control the adjusting means and to memorize a plurality of preferred component arrangements, including at least the first component arrangement and the second component arrangement;
- (g) causing the controller to respond to a first component arrangement signal received from a location remote from the controller by controlling the adjusting means to provide the memorized first component arrangement; and
- (h) causing the controller to respond to a second component arrangement signal received from a location remote from the controller by controlling the adjusting means to provide the memorized second component arrangement.

23. A computer readable medium according to claim 20, wherein the personal computer is located in an automobile that includes means for adjusting at least one component of the automobile to provide a plurality of arrangements of the at least one component, said preferred arrangements including at least a first component arrangement that is associated with the personal computer, and wherein the computer readable medium also contains program instructions for:
- (c) causing the controller to control the adjusting means and to memorize at least the first component arrangement; and
- (d) causing the controller to respond to a first component arrangement signal received from a location remote from the controller by controlling the adjusting means to provide the memorized first component arrangement.

24. A computer readable medium according to claim 20, wherein the personal computer is located in an automobile that includes keyless-entry system, and wherein the computer readable medium contains program instructions for:
- (c) causing the controller to control the keyless-entry system; and
- (d) causing the controller to respond to an unlock-request signal received from a location remote from the controller by causing a keyless-entry system to unlock one or more doors of the automobile.

* * * * *